United States Patent [19]
Luzenberg

[11] Patent Number: 4,576,012
[45] Date of Patent: Mar. 18, 1986

[54] EVAPORATIVE COOLER

[75] Inventor: Robert S. Luzenberg, Tierra Verde, Fla.

[73] Assignee: Computer Air Corp., Pompano Beach, Fla.

[21] Appl. No.: 593,706

[22] Filed: Mar. 26, 1984

[51] Int. Cl.<sup>4</sup> ............................................. G05D 23/32
[52] U.S. Cl. ....................................... 62/157; 62/171; 62/305; 236/46 F
[58] Field of Search .......................... 62/157, 171, 305; 236/46 R

[56] References Cited

U.S. PATENT DOCUMENTS

| | | | |
|---|---|---|---|
| 3,995,443 | 12/1976 | Iversen | 62/305 |
| 4,240,265 | 12/1980 | Faxon | 62/305 X |
| 4,259,268 | 3/1981 | DiRoss | 62/314 X |
| 4,290,274 | 9/1981 | Essex | 62/157 |
| 4,379,712 | 4/1983 | Sperr, Jr. et al. | 98/30 X |

Primary Examiner—Henry Bennett
Attorney, Agent, or Firm—Frijouf, Rust & Pyle

[57] ABSTRACT

An apparatus for applying a cooling water spray to the heat exchanger of an air conditioning condenser unit is disclosed. The apparatus includes a solenoid valve for controlling the flow of water, a spray nozzle positioned so as to direct the cooling water spray onto the air intake side of the heat exchanger, and a control unit for controlling the solenoid valve. The control unit is essentially a very low frequency oscillator or timer, the "OFF" and "ON" durations of which are independently selectable.

3 Claims, 5 Drawing Figures

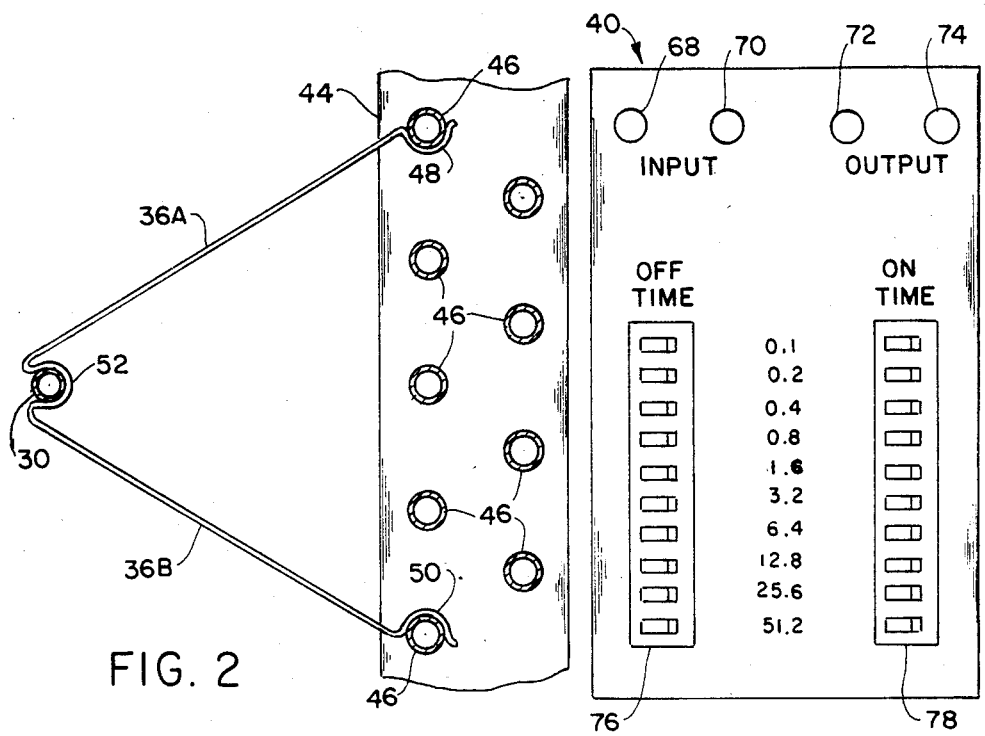
FIG. 2
FIG. 4
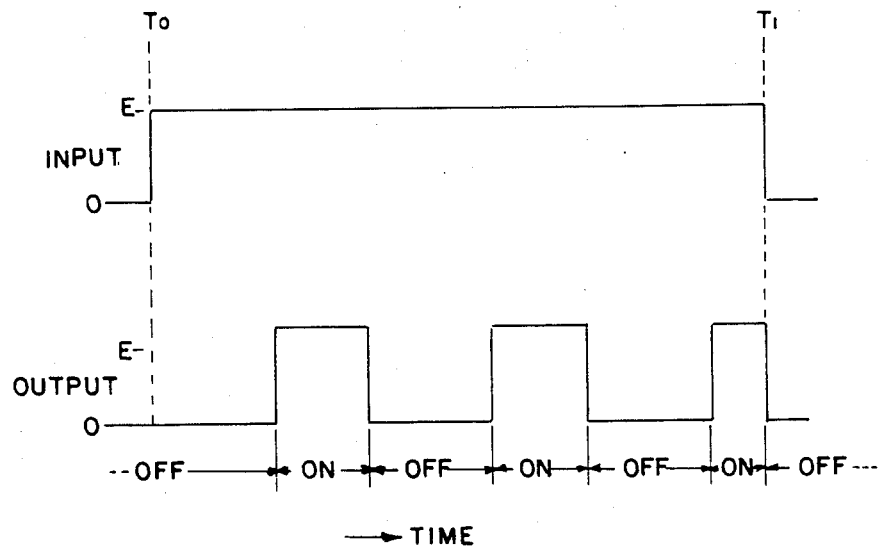
FIG. 5

EVAPORATIVE COOLER

BACKGROUND OF THE INVENTION

1. Field of the Invention

This invention relates to an apparatus for cooling the heat exchanger of an air conditioning condenser unit and more particularly to an apparatus for applying a cooling water spray to the heat exchanger of an air conditioning condenser unit.

2. Information Disclosure Statement

Air conditioning systems, both for residential and commercial use, are often installed with a condenser unit which uses the atmosphere as a heat sink. The condenser unit is generally mounted outside the structure enclosing the space to be air conditioned. Typical locations for the condenser unit are at ground level just outside the structure to be air conditioned, or on the roof of the structure.

In the condenser unit of typical installations, a compressor operates periodically under the control of a thermostat (located in the air conditioned space) to pump a hot refrigerant gas through a heat exchanger where the gas gives up its thermal energy to the atmosphere. This is accomplished by drawing air through the heat exchanger, thus heating the air and cooling the refrigerant gas to below its boiling point at the operating pressure of the system.

As the heat load upon the system increases, the compressor tends to run for longer intervals of time, and the "OFF" periods are of increasingly shorter duration. Wear in the system, particularly in the compressor, is increased, power consumption is dramatically increased, and overall system efficiency generally decreases under such conditions.

Additional cooling capacity in the condenser unit heat exchanger can be of substantial benefit during periods of a high heat load on the system, and may also provide energy consumption benefits in general even where the heat load is not exceptionally high. Means for providing additional cooling to the condenser unit heat exchanger have often involved the use of water for cooling purposes in the prior art. One method employed in the prior art was to drip water onto the heat exchanger cooling fins, where it would generally run down the vertical fins and hopefully wet the fin surface, thus providing both evaporative and conductive cooling for the heat exchanger.

Another water cooling method in the prior art is described in U.S. Pat. Nos. 4,170,117 and 4,240,265. This method uses a water spray directed at the air intake side of the condenser unit heat exchanger. The advantage of this method is that better dispersion of the cooling water is achieved, thus making better use of the cooling medium throughout the intake area of the heat exchanger. A further refinement discribed in the above-mentioned patents is the control of the water spray so that it is generally shut off when the system is not in operation. As described in the above-mentioned patents, this control is accomplished by use of a thermal sensor placed in contact with the heat exchanger of the condenser unit. In the prior art systems, this thermal sensor may or may not be within the spray pattern of the cooling water spray.

A significant disadvantage of the thermally-controlled spray system is that it tends to cause excessive amounts of water to be applied for excessive amounts of time to the heat exchanger, with the result that the heat exchanger is continually wet during operation. Excess water generally collects near the bottom of the heat exchanger, resulting in such problems as growth of fungus and flooding. Such excess water can also encourage the growth of excessive amounts of vegetation in cases where the condenser unit is installed at ground level, and such vegetation can tend to interfere with air flow into the intake side of the heat exchanger. In rooftop installations, the more or less continual flooding can cause problems with the roof covering material. Excessive corrosion of metallic parts and deposit of scale are also significant problems in these prior systems.

These problems exist even in the systems employing thermal control of the water flow, since the heat exchanger can remain sufficiently hot for a period of time after the shutdown of the compressor for the system to continue supplying water which is not actually needed for cooling purposes at that time. Further, the location of a thermal sensor in the heat exchanger itself for providing control of the flow of water can often result in the sensing of incorrect apparent conditions if the cooling water spray can affect the thermal sensor. Even if the thermal sensor is located outside of the normal spray pattern for the cooling water spray, varying wind conditions can cause the spray to be blown into the area of the heat exchanger which houses the thermal sensor, thus creating different ambient conditions and causing incorrect operation of the system.

The above disadvantages of flooding and applying excessive water in general to the heat exchanger of the condenser unit apply equally to the "drip" systems mentioned above, of course.

Therefore, it is an object of this invention to provide an apparatus which overcomes the aforementioned inadequacies of the prior art devices and provides an improvement which is a significant contribution to the advancement of the pertinent art.

Another object of this invention is to provide an apparatus for applying a cooling water spray to the heat exchanger of an air conditioning condenser unit, a solenoid valve for controlling water flow, a spray nozzle for creating and directing the cooling water spray onto the heat exchanger, and a control unit for controlling the solenoid valve.

Another object of this invention is to provide an apparatus for applying a cooling water spray to the heat exchanger of an air conditioning condenser unit as described above which includes a water filter with a replaceable filter element in order to filter the water prior to applying it as a cooling water spray to the heat exchanger.

Another object of this invention is to provide an apparatus for applying a cooling water spray to the heat exchanger of an air conditioning condenser unit as described above which includes a water filter which includes water softening means for removing scale-forming ions from the water prior to applying it as a cooling spray to the heat exchanger.

Another object of this invention is to provide an apparatus for applying a cooling water spray to the heat exchanger of an air conditioning condenser unit as outlined above in which the cooling water spray may be applied to the heat exchanger only when the heat exchanger is actually in operation.

Another object of this invention is to provide an apparatus for applying a cooling water spray to the heat exchanger of an air conditioning condenser unit, including a solenoid valve, a spray nozzle and a control unit as described above, wherein the control unit is merely a very low frequency oscillator with its "OFF" and "ON" period being independently selectable.

Another object of this invention is to provide an apparatus for applying a cooling water spray to the heat exchanger of an air conditioning condenser unit as described above, in which a sacrificial anode is installed in contact with the heat exchanger in order to minimize the above-mentioned problems of corrosion which are typical in systems of this type.

Other objects and a fuller understanding of this invention may be had by referring to the summary of the invention, the description and the claims, taken in conjunction with the accompanying drawings.

SUMMARY OF THE INVENTION

The invention may be incorporated into an apparatus for applying water in the form of a cooling water spray to the heat exchanger of an air conditioning condenser unit in order to increase the cooling effect of the heat exchanger. The apparatus of this invention is intended to operate with an air conditioning system having a condenser unit which includes a compressor and a heat exchanger which uses the atmosphere as a heat sink. The apparatus of this invention provides for a supply of water to be controlled by a solenoid valve, the water ultimately being directed to a spray nozzle attached to and spaced apart from the heat exchanger of the air conditioning condenser unit. The spray nozzle is positioned so as to create and direct a cooling water spray onto the air intake side of the heat exchanger. In the preferred embodiment of this invention, a water filter is employed in the water supply line.

In the preferred embodiment, the water is first filtered in a filter device which includes a replaceable filter element. The filter also includes water-softening means to remove scale-forming ions from the water. The water is then routed through the solenoid valve prior to reaching the spray nozzle.

The solenoid valve contains biasing means which urges the valve into the closed position, thus blocking the flow of water through the solenoid valve in the absence of an actuating signal.

The actuating signal for the solenoid valve comes from the control unit, which is activated only when the heat exchanger is actually in operation. This synchronous activation of the control unit is accomplished by providing power to the control unit from the thermostat signal which is used to activate the compressor contactor which is used to relay power to the compressor. In an alternative embodiment, the actual power to the compressor may be used to provide the activating power to the control unit.

The control unit essentially comprises a very low frequency oscillator. The "OFF" portion and the "ON" portion of the period of this oscillator are independently selectable in duration by means of "DIP" switches included within the control unit. Typical durations selectable are in the range of two seconds to one minute.

Upon installation of the apparatus of this invention, various factors such as the cooling demand expected to be placed upon the air conditioning system, ambient temperature and humidity, and typical water supply pressure are taken into account in making the initial selection of the "OFF" and "ON" portions of the period of the control unit. The final values of the durations of the "OFF" and "ON" durations may be refined empirically, of course. The object in any case is to limit the amount of water sprayed onto the heat exchanger so as to merely wet the fins of the heat exchanger when the heat exchanger is actually in operation and at its highest temperature. The water supply is limited through the selection of the spray time interval so that no runoff of water whatsoever occurs, thus avoiding any flooding problems. As a result, the cooling water spray provides a super cooling effect on the heat exchanger which is due almost entirely to evaporative cooling and which does not rely on conduction cooling.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

FIG. 2 is an enlarged partial sectional elevational view of the condenser heat exchanger taken along the line 2—2 of FIG. 1.

FIG. 4 is a front view of a typical control unit.

FIG. 5 is a timing diagram showing the relationship between the input to the control unit and the output therefrom.

DETAILED DESCRIPTION

Figure 1:
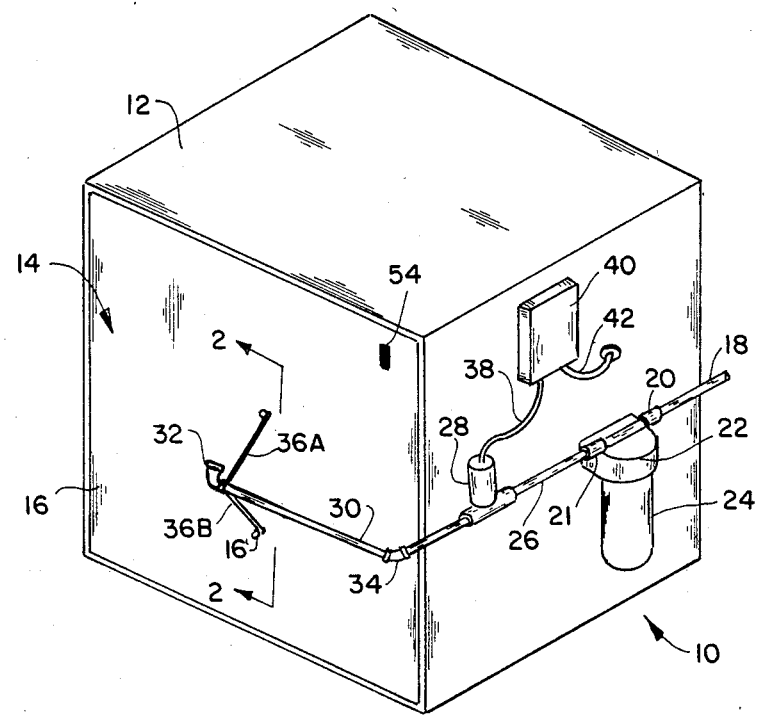
FIG. 1 is a perspective view of the evaporative cooler installed on an air conditioning condenser unit.

The evaporative cooler generally designated 10 as installed on an air conditioner system, is shown in perspective in FIG. 1. The apparatus of this invention is installed entirely on the air conditioning condenser unit 12 of an air conditioning system which uses the atmosphere as a heat sink. The typical air conditioning condenser unit 12 contains a heat exchanger generally designated 14, which comprises in part a plurality of cooling fins 16 utilized to effect the exchange of heat. The apparatus of this invention includes an inlet pipe 18 for water, which is connected by a coupling 20 to a filter housing 22. Attached to the filter housing 22 is a filter canister 24 containing a replaceable filter element and water-softening means (not shown in FIG. 1) to remove impurities and scale-forming ions from the water.

Water is conducted from the filter housing 22 through first water line 26 which is connected to the filter housing 22 by another coupling 21. The water is conducted through first water line 26 to solenoid valve 28 and then through a second water line 30, which terminates in a spray nozzle 32. First water line 26 and second water line 30 may be flexible or inflexible. In the latter case, one or more elbows 34 may be required in either first water line 26 or second water line 30. Spray nozzle 32 is disposed on the air intake side of heat exchanger 14 and spaced apart from heat exchanger 14 by nozzle support means. In the preferred embodiment, this nozzle support means comprises a wire bracket of stainless steel or similar material comprising at least two support members. Two such nozzle support members, 36a and 36b, are depicted in FIG. 2.

Solenoid valve 28 is actuated by a signal carried on solenoid cable 38 which connects the control unit 40 to the solenoid valve. Control unit 40 receives its power through power cable 42.

FIG. 2 shows a partial sectional elevation view of the typical heat exchanger generally denoted as 14 showing one fin 44 of the plurality of cooling fins 16, said cooling fin 44 being penetrated by a plurality of refrigerant tubes 46, which are shown in cross section in FIG. 2.

The preferred embodiment of the nozzle support means as shown in FIG. 2 is a single piece of stainless steel wire bent generally in a "V" shape, the individual nozzle support members 36a and 36b forming the two sides of the "V". Near the end of nozzle support member 36a, the wire is bent to form refrigerant tube clip 48, which is an approximately semi-circular shape having a diameter approximately equal to that of the refrigerant tubes 46, and oriented so as to be open toward the outside of the "V" of the nozzle support means. Similarly, refrigerant tube clip 50 is formed at the end of nozzle support member 36b by bending the stainless steel wire in an approximately semi-circular shape having a diameter approximately equal to that of the refrigerant tubes 46, again oriented so that the open side is toward the outside of the "V". Near the apex of the "V" of the nozzle support means the wire is bent in a circular shape to form water line clip 52 having a diameter preferably slightly smaller than second water line 30, thus enabling the nozzle support means to firmly grasp the second water line 30 to which the nozzle (not shown in FIG. 2) is attached. In the preferred embodiment, the water line clip 52 is approximately in the shape of a three-fourths circle, with the open side away from the inside of the "V" of the nozzle support means. The unrestricted shape of the nozzle support means depicted in FIG. 2 is a broader "V" than is shown. Upon installation, the nozzle support means is compressed (thus making the "V" narrower), and the ends are inserted into the plurality of fins 16 of heat exchanger 14, whereupon the nozzle support means is permitted to expand toward its natural shape until refrigerant tube clips 48 and 50 come to rest against the desired refrigerant tubes 46, thus locking the nozzle support means in place with respect to heat exchanger 14.

Figure 3:
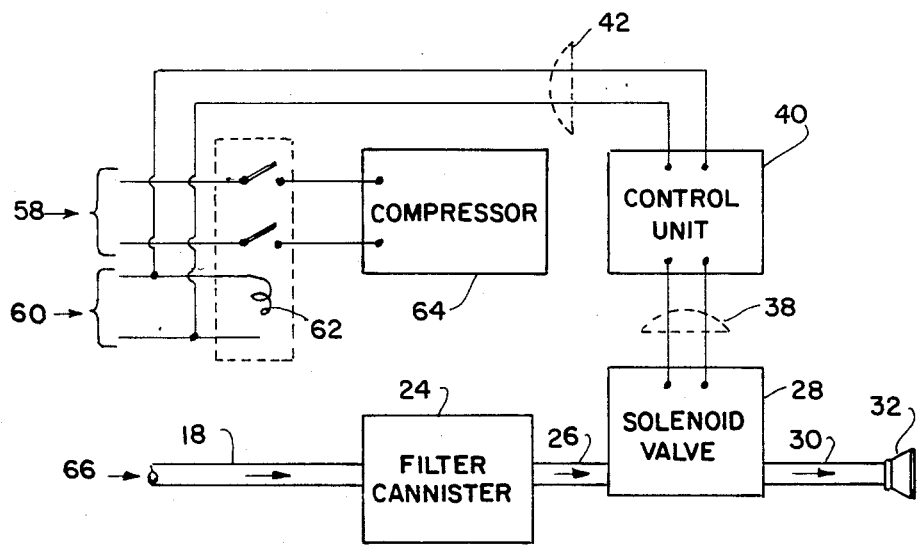
FIG. 3 is a combined schematic and block diagram showing the interconnection of the various components of the evaporative cooler.

FIG. 3 shows the interconnection and interrelationship of the various components of the evaporative cooler of the invention in the form of a combined schematic and block diagram. Water 66 is conducted through inlet pipe 18 to the filter canister 24 which contains the replaceable filter element (not shown in the drawing). In the preferred embodiment, the water, after filtration, is conducted through first water line 26 to solenoid valve 28 which, if open, permits the continued flow of water through second water line 30 to spray nozzle 32 which then forms a cooling water spray and directs it against the air inlet side of heat exchanger 14. Solenoid valve 28 includes biasing means (not shown in the drawing) which maintains the valve in a closed position in the absence of any actuating signal. The solenoid valve 28 receives its actuating signal through solenoid cable 38 from control unit 40.

Control unit 40 is essentially a very low frequency oscillator which is activated only when the heat exchanger 14 is in operation. Since heat exchanger 14 is in operation only when the compressor is running, synchronizing the actuation of control unit 40 with the operation of heat exchanger 14 is accomplished by providing power to control unit 40 through power cable unit 42 from the compressor control signal 60 which is used to operate the compressor contactor 62. In a typical system, this contactor 62 is used to relay input power 58 from the power source to the compressor 64. In the preferred embodiment as shown in FIG. 3, the relatively low voltage compressor control signal 60 is used to activate the control unit 40 simultaneously with the activation of the compressor 64 and heat exchanger 14, but it will be appreciated by those skilled in the art that control unit 40 could also be activated by the relatively higher voltage associated with input power 58 used to drive the compressor 64, with the same end result.

FIG. 4 shows a front view of a typical control unit 40 of the oscillator type. Input terminals 68 and 70 are provided for connection to power cable 42, while output terminals 72 and 74 are provided for connection to solenoid cable 38. In the preferred embodiment of this invention, the oscillator comprising the control unit has the capability of a selectable period of oscillation. Moreover, the duration of the "OFF" portion of the cycle is independently selectable, as is the duration of the "ON" portion of the cycle. In a typical control unit as shown in FIG. 4, the selection of the durations of the "OFF" and "ON" portions of the cycle is accomplished by appropriate setting of the digital "DIP" switches, which comprise the "OFF" time selector switch 76 and the "ON" time selector switch 78.

In FIG. 5, a timing diagram for an interval of operation of the evaporative cooler is shown. In the upper portion of FIG. 5, the input voltage to control unit 40 is shown rising from 0 to the value "E" at time $t_0$, where it remains until a later time $t_1$, at which instant this input voltage returns to 0. This input voltage to control unit 40 is in the higher (E) state coincidentally with the application of power to the compressor 64 and coincidentally with the operation of heat exchanger 14. The output of control unit 40, which is used to drive the solenoid valve 28, is shown in the lower portion of FIG. 5. Prior to $t_0$, the output voltage is at the 0 level, and the biasing means within solenoid valve 28 prevents the flow of water therethrough. In the preferred embodiment of the control unit 40, when power is applied to the control unit 40 at time $t_0$, control unit 40 begins the "OFF" portion of its period. At the conclusion thereof, the oscillator comprising control unit 40 changes state, thus ending the "OFF" portion of its cycle and beginning the "ON" portion of its cycle. The "OFF" and "ON" portions of the cycle need not be of the same length, although all "OFF" portions will be of the same duration and all "ON" portions will be of the same duration. As shown in FIG. 5, the "OFF" portion may be of greater duration than the "ON" portion of the cycle of the oscillator. As long as the input voltage remains in the high state, the oscillator in the control unit continues to oscillate according to the selected durations. At time $t_1$ when the compressor 64 is shut off and heat exchanger 14 ceases operation, the input voltage to control unit 40 drops to its 0 state and the output of the control unit 40 goes to the 0 level and remains there until the above-described sequence is repeated.

Such a repetition would typically occur within several minutes, depending upon the heat load of the space to be air conditioned and upon the setting of the thermostat controlling the compressor 64 through contactor 62.

Typical durations of the "OFF" and "ON" portions of the control unit are in the range from two seconds to one minute. These durations are set by use of off time selector switch 76 and on time selector switch 78 in control unit 40, taking into account such factors as the cooling demand placed upon the air conditioning system, the ambient temperature and humidity, and typical pressure in the water supply, the object being to wet the heat exchanger 14 with a fine mist of water during the time when heat exchanger 14 is in operation in order to provide evaporative super cooling for heat exchanger 14 and thereby lower the head pressure of compressor 64 and increase the efficiency of the air conditioning system without spraying so much water as to cause "flooding" and conductive cooling of heat exchanger 14.

The present disclosure includes that contained in the appended claims as well as that of the foregoing description. Although the invention has been described in its preferred form with a certain degree of particularity, it is understood that the present invention of the preferred form has been made only by way of example, that numerous changes in the details of construction and the combination and arrangement of parts may be resorted to without departing from the spirit and scope of the invention.

What is claimed is:

1. An apparatus for applying water in the form of a cooling water spray to the heat exchanger of an air conditioning condenser unit, comprising in combination:

a solenoid valve for controlling the flow of the water;

a spray nozzle positioned so as to direct the cooling water spray onto the heat exchanger;

a first water line to conduct water to said solenoid valve;

a second water line to conduct water from said solenoid valve to said spray nozzle;

a control unit for controlling said solenoid valve;

a water filter interposed in said first water line for filtering the water supplied to said solenoid valve, wherein said water filter includes a filter element which is replaceable;

wherein said solenoid valve contains bias means for urging said solenoid valve into the closed position and for preventing the flow of water through said solenoid valve except when said solenoid valve is actuated by said control unit and wherein said control unit actuates said solenoid valve only when the heat exchanger is in operation;

wherein said control unit is an oscillator the period of which is selectable;

wherein the duration of the "OFF" portion of said period of said oscillator is selectable and the "ON" portion of said period of said oscillator is also selectable with the durations of the "OFF" and "ON" portions of the control unit being in the range from 2 seconds to 1 minute; and a sacrificial anode in contact with the heat exchanger.

2. An apparatus as set forth in claim 1, further including a nozzle support means for supporting said second water line; and said nozzle support means is attached to the heat exchanger.

3. An apparatus as set forth in claim 2, wherein said water filter includes water-softening means for removing scale-forming ions from the water.

* * * * *